United States Patent [19]

Hanks et al.

[11] Patent Number: 5,142,693
[45] Date of Patent: Aug. 25, 1992

[54] DATA CAPABLE RADIO COMMUNICATION CONSOLE

[75] Inventors: Linda A. Hanks, Elk Grove Village; Gerald R. Drobka, Schaumburg; Gregory A. Dertz, Lake in the Hills, all of Ill.

[73] Assignee: Motorola, Inc., Schaumburg, Ill.

[21] Appl. No.: 234,763

[22] Filed: Aug. 22, 1988

[51] Int. Cl.⁵ .............................. H04B 17/00
[52] U.S. Cl. ........................... 455/53.1; 455/212; 455/67.1; 340/825.06
[58] Field of Search ............ 455/54, 56, 67, 212, 455/221, 53; 370/110.1, 95; 375/5; 379/94, 97; 340/825.06

[56] References Cited

U.S. PATENT DOCUMENTS

| | | | |
|---|---|---|---|
| 4,663,765 | 5/1987 | Stuphin et al. | 375/5 |
| 4,773,080 | 9/1988 | Nakaima et al. | 375/5 |
| 4,780,715 | 10/1988 | Kasugai | 455/54 |
| 4,797,875 | 1/1989 | Popischil et al. | 370/110.1 |
| 4,803,726 | 2/1989 | Levine et al. | 370/110.1 |
| 4,823,373 | 4/1989 | Takahashi et al. | 375/5 |

OTHER PUBLICATIONS

PCT WO8400651, Burke, Feb. 1984.

*Primary Examiner*—Curtis Kuntz
*Attorney, Agent, or Firm*—Steven G. Parmelee; Wayne J. Egan

[57] ABSTRACT

A communication control console having both data and voice capability. Data signalling as transmitted on a voice channel is converted into an internally compatible format, regardless of the original signalling type, for use by the console. Conversely, data messages originating from the console are converted from the internal format to the appropriate external signalling format.

2 Claims, 4 Drawing Sheets

DATA CAPABLE RADIO COMMUNICATION CONSOLE

TECHNICAL FIELD

This invention relates generally to radio communication systems, and particularly to radio communication control consoles.

BACKGROUND ART

Two-way radio communication systems having at least one voice channel are well understood in the art. In many systems, such voice channels support both voice and binary data signals that provide various system features, such as emergency call, voice select, push-to-talk IDs, and so forth. (As used herein, "binary" refers to signalling having one of two possible valid states.)

Communication control consoles are also known, and are typically used to monitor and control communications with a group of radio subscriber units (as used herein, "subscriber units" refers to fixed stations, mobile stations, and portable stations). In particular, a system operator can monitor a number of voice communications at any given time, and can also originate or participate in voice communications as well.

Unfortunately, to date, there are no consoles capable of dealing both with voice signals and binary data signals as supported by the RF communication medium. There are consoles that can support both voice and non-binary signalling, such as tone signalling, but the accommodation of tone and voice signalling presents relatively simple design considerations when compared to the issues involved with combined voice and binary data signalling.

A need therefore exists for a communication control console capable of supporting both voice and binary data signals as transmitted or received on an RF voice channel.

SUMMARY OF THE INVENTION

This need is substantially met through provision of the communication control console disclosed herein. The disclosed console can convert received voice signals into audible signals to facilitate monitoring of voice traffic, and also has the capability of decoding received binary data signals to support various communication features otherwise provided and enabled by the binary signalling. In one embodiment, the received binary signals are converted into a second data format compatible for use in the console. In another embodiment, a channel signalling modem can be used to detect the presence of incoming binary data to thereby allow appropriate muting of the audio processing path for the console during receipt of binary data signals. In another embodiment, for use in systems that support multiple types of signalling, the channel signalling modem can identify the type for a particular received data signal, before converting the received data signal into the internal data format for use by the console.

BEST MODE FOR CARRYING OUT THE INVENTION

Figure 1:
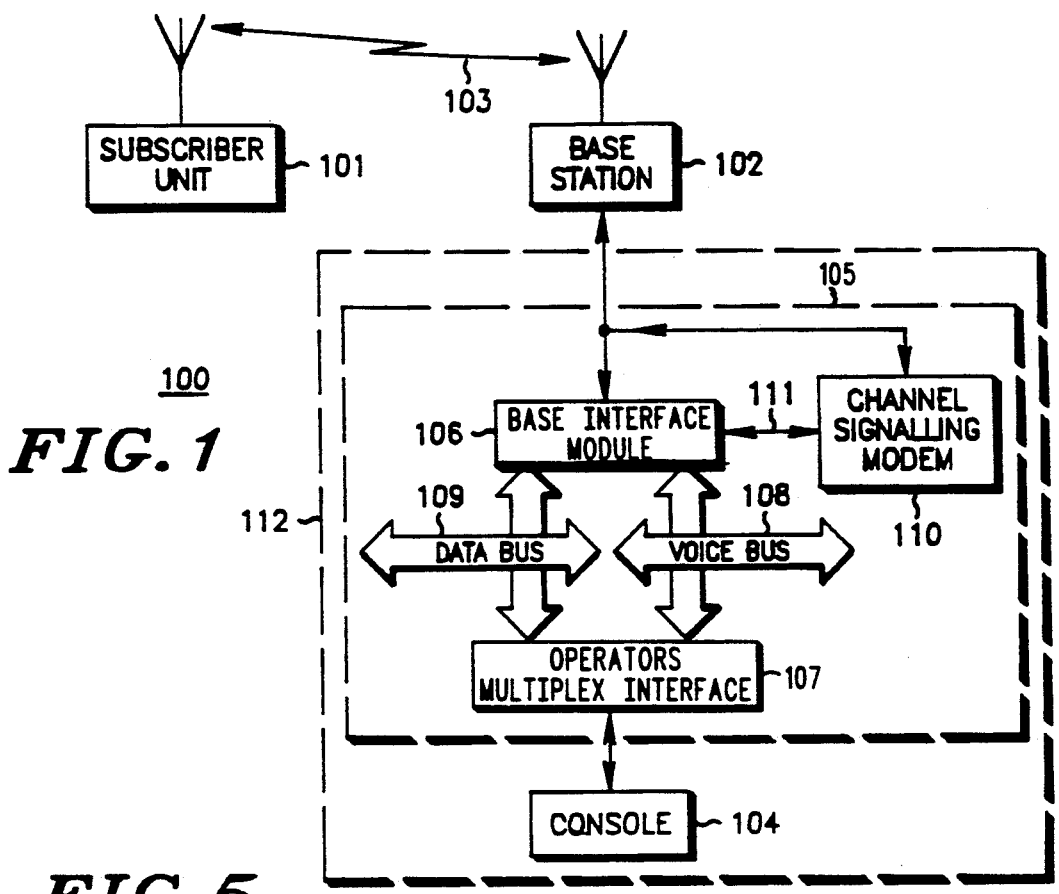
FIG. 1 comprises a block diagram depiction of a radio communication system that includes the invention.

Referring now to FIG. 1, a radio communication system can be seen as generally depicted by the numeral 100. The system includes generally one or more subscriber units (101), one or more base stations (102), one or more radio frequency voice channels (103), and a radio communication control console (112) that includes a console (104) and a central electronics bank (CEB) (105). Each subscriber unit (101) and base station (102) can be comprised of any known and appropriate radio communication units.

The CEB (105) typically includes a base interface module (BIM) (106) and an operator's multiplex interface (OMI) (107). Each BIM (106) provides an appropriate interface with a base station (102), and each OMI (107) provides an appropriate interface with a console (104). Therefore, in a system having ten base stations and three consoles, there would be ten BIMs and three OMIs. In addition, the BIM (106) and the OMI (107) communicate with one another via a voice bus (108) and a data bus (109). (Additional information regarding these general components of the CEB (105) can be found in U.S. Pat. No. 4,603,418 entitled "Multiple Access Data Communication Controller For A Time Division Multiplex Bus", and in U.S. Pat. No. 4,630,263 entitled "Time Division Multiplex Communication Control System". Both of these documents are incorporated herein by this reference.

In this embodiment, the CEB (105) also includes a channel signalling modem (CSM) (110) that communicates directly with the BIM (106) via a serial link (111) having an RS232 format link, and also directly with the base station(s) (102).

Figure 2:
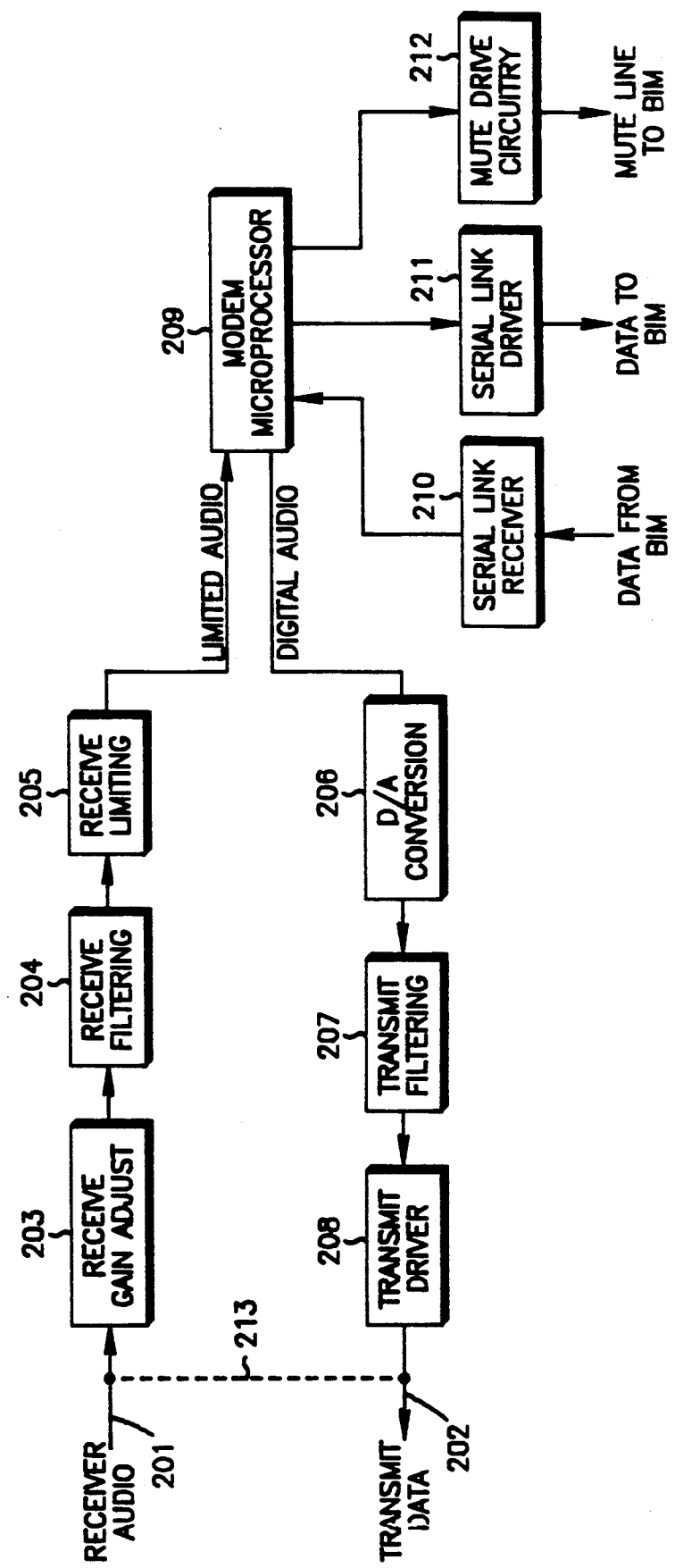
FIG. 2 comprises a block diagram depiction of the channel signalling modem.

With reference to FIG. 2, in a full duplex embodiment the CSM (110) includes a separate receive (201) and a transmit (202) line for connection to the base station (102) as referenced above. (In a half duplex environment, the receive and transmit lines could be coupled as indicated by the phantom line designated by the reference numeral 213). The receive line (201) includes an appropriate gain adjustment unit (203), a filtering unit (204), and a limiting unit (205). The transmit line (202) includes an appropriate digital-to-analog conversion unit (206), a filtering unit (207) and a transmit unit (208). So configured, the CSM (110) receives audio signals on the receive line (201) and appropriately processes them for further processing by a microprocessor (209) (such as a 68HCII as manufactured and supplied by Motorola, Inc.). The transmit line (202) accepts digital data from the microprocessor (209) and converts it into an analog format that is then suitably conditioned for subsequent transmission to the base station (102).

In addition, the CSM (110) includes a serial link receiver (210) and a serial link driver (211) for communicating across the serial link (111) with the BIM (106), and a mute drive circuit (212) for transmitting a mute signal to the BIM (106). Additional explanation regarding the mute drive signal will be provided further below.

Figure 3:
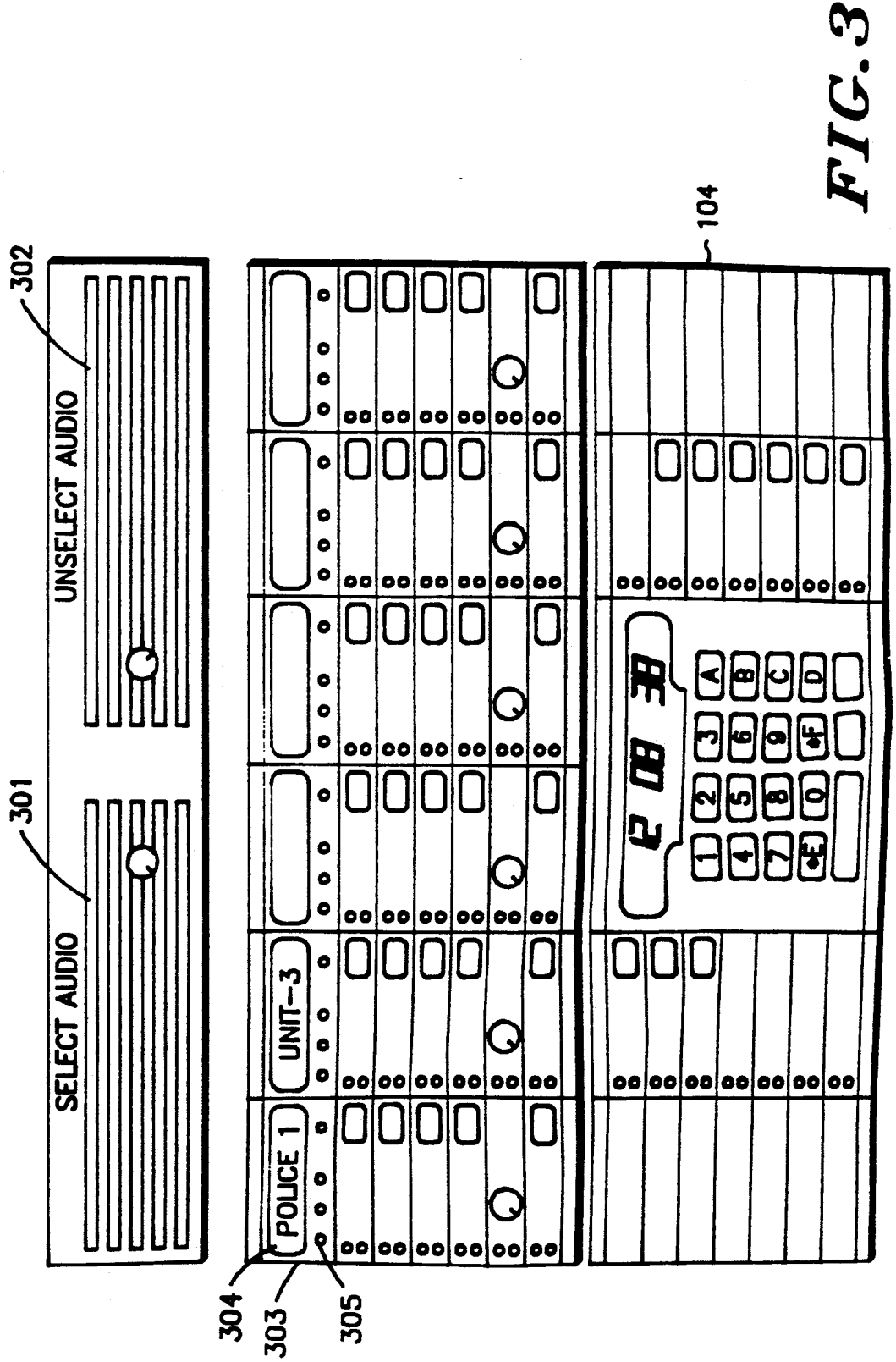
FIG. 3 comprises a front panel depiction of a console.

With reference to FIG. 3, a console panel can be seen as depicted by the numeral 104. The console includes an appropriate speaker (301) for rendering a selected voice channel audible, and a second speaker (302) for rendering all other unselected (though still monitored) voice channels audible. Various channel control modules (CCM) (303) can be provided, with two being depicted in FIG. 3. Each CCM (303) includes an appropriate channel alias (304) to provide information to the operator regarding the channel being monitored. Other switches, display indicators and other controls are provided as appropriate to facilitate the channel monitoring and communication functions of the console (104). (Additional information regarding such a console can be found in System Planner document R4-2-37 as provided for the Centracom Series II control centers, and in document R4-2-73 as provided for the Centracom Series II Plus control centers, which System Planners are available from Motorola, Inc., 1303 East Algonquin Road, Schaumburg, Illinois 60196. This document is incorporated herein by this reference.)

Figure 4:
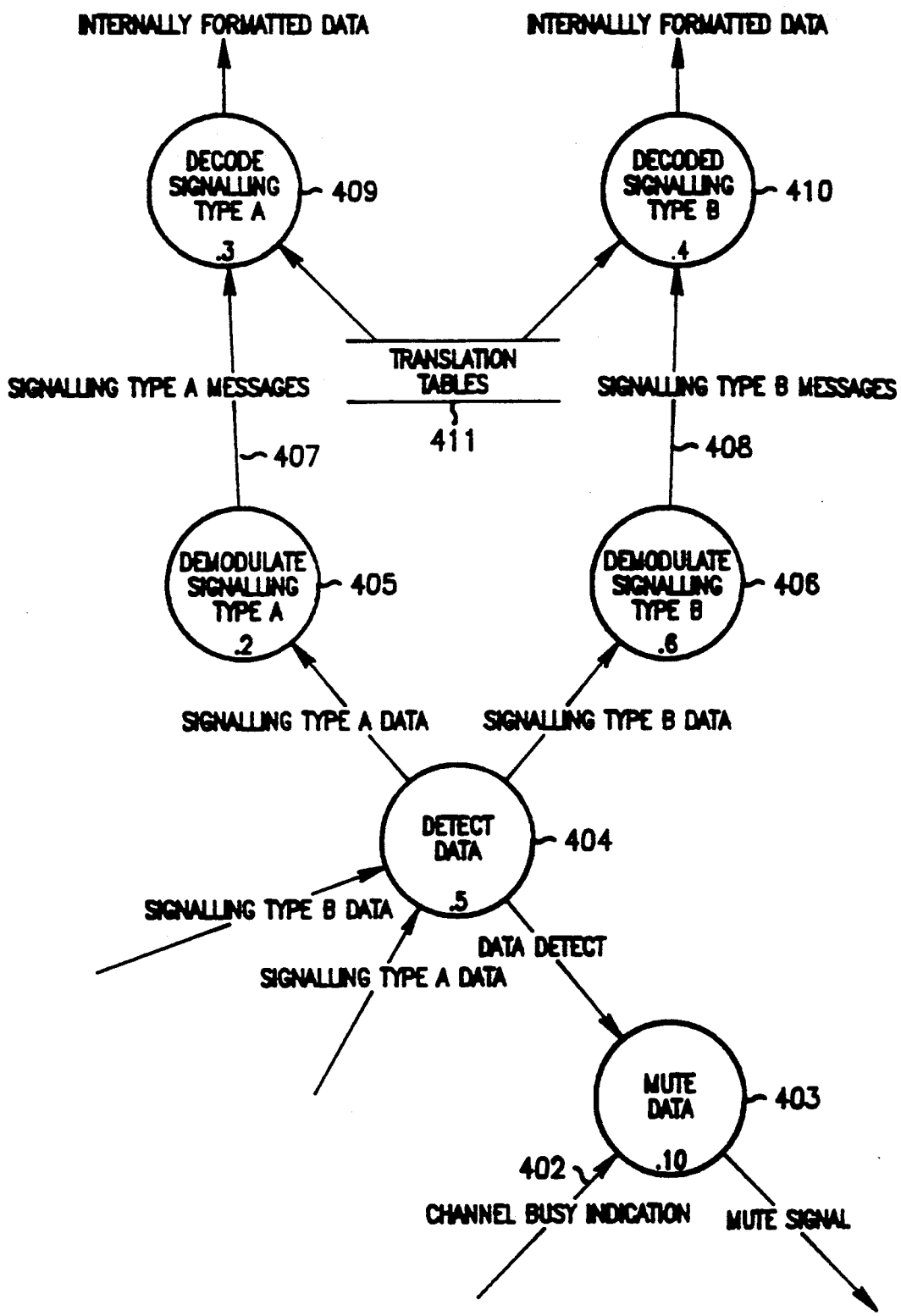
FIG. 4 comprises a data flow diagram of the received signal processing aspects of the invention.

Referring now to both FIGS. 1 and 4, operation of the invention, and particularly of the channel signalling modem (110), will be described.

Ordinary received voice signals are passed from the base station (102) to the BIM (106), and then through the voice bus (108) to the OMI (107) and the console (104) where they can be rendered audible. When a binary data signal arrives at the base station (102) on the voice channel (103), the CSM (110) senses the presence of data (404) and provides a mute signal (403) via the mute drive circuit (212) to the BIM (106) to thereby cause the BIM (106) to mute or otherwise block the audio processing path and thereby prevent the data from reaching the console (104) and being rendered audible.

In the alternative, the CSM (110) can be made responsive to an appropriate signal from the base station (102) wherein the base station (102) provides an indication to the CSM (110) when channel activity on the voice channel (103) is about to begin. In a signalling system where most or all voice signals are preceded by an initial data signal, the CSM (110) can react to this channel busy indication (402) from the base station (102) to also initiate the mute function (403). When the data signal then concludes, or when voice traffic initiates, the CSM (110) can then unmute the BIM (106).

In this embodiment, it may be assumed that the communication control console (112) supports a plurality of voice channels (103), base stations, and subscriber units (101). In addition, it may be presumed that some of these subscriber units (101) communicate in conjunction with a first type of data signalling such as binary data signalling (designated type A herein), and other units communicate with a second type of signalling such as five tone signalling (designated type B data herein). The detect data process (404) also determines whether the signalling being received constitutes type A data or type B signalling. This identification can be readily accomplished in the microprocessor (209) by analysis of the incoming signal.

Upon identifying the signalling, the CSM (110) demodulates the signalling in accordance with the signalling type (405 or 406) to thereby obtain the signalling message (407 or 408). The message is then decoded (409 or 410) and converted into an appropriate second data format through use of an appropriate translation table (411). So processed, the message will be internally formatted in a manner consistent with what the OMI (107) is capable of decoding and responding to. Further, all signal types are translated into the same internal format. The translation table (411) is simply comprised of one-for-one translation codes such that the original signalling type (i.e., type A or type B) can be translated into the second data format. So formatted, the data passes from the CSM (110) to the BIM (106) then to the OMI (107) via the data bus (109), and then to the console (104). For example, with reference to FIG. 3, a data message indicating an emergency call on the monitored voice channel (103) can be used to light an emergency indicator (305) that appears on the face of the CCM (303) then being monitored.

Figure 5:
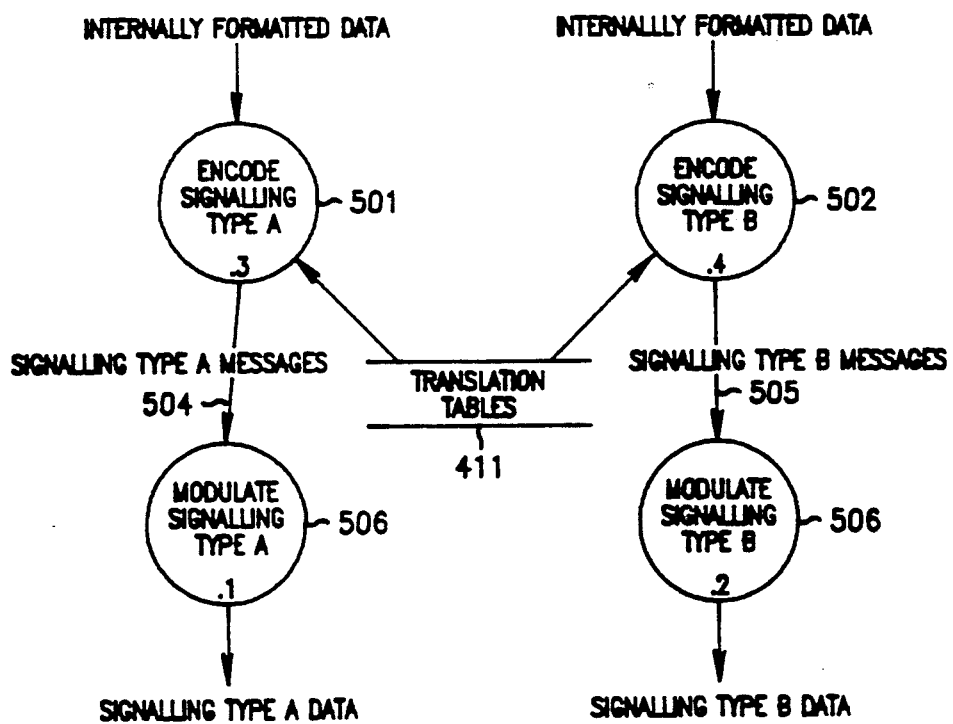
FIG. 5 comprises a data flow diagram depicting the transmit data processing aspects of the invention.

With reference to FIG. 5, the communication control console (112) can also initiate data signalling messages having the internal format and pass these via the data bus (109) to the BIM (106). The BIM can then provide this information via the serial link (111) to the CSM (110), wherein the internally formatted data as provided by the console (104) is appropriately encoded into a signalling format (type A or type B) (501 and 502) appropriate to the voice channel (103) then in use. The encoding process (501 or 502) works similar to the decoding process and the CSM (110) again makes use of the translation tables (411) to convert the internally formatted data into the appropriate type A or type B message (504 and 505). Once converted, the message can then be modulated (506) as appropriate and transmitted to the base station (102) for transmission on the voice channel (103).

We claim:

1. In a radio communications system having at least one voice channel, which voice channel can support both voice signals and binary data signals, and a communication control console for monitoring and controlling, at least in part, a plurality of subscriber units that use said at least one voice channel, a method of monitoring said subscriber units comprising, integral to said communications control console, the steps of:
   A) converting at least some received voice signals into audible signals;
   A1) detecting the presence of incoming binary data signals initiated by a subscriber unit;
   A2) receiving the incoming binary data signals;
   B) decoding at least some received binary data signals;

wherein said system includes audio processing means for processing said voice signals and rendering them audible, and wherein said method includes the additional step of, responsive to detecting the presence of incoming binary data signals initiated by a subscriber unit, muting said audio processing means when receiving said binary data signals.

2. In a radio communications system having at least one voice channel, which voice channel can support both voice signals and binary data signals, and a communication control console for monitoring and communicating with a plurality of subscriber units that use said at least one voice channel, a method of monitoring and communicating with said subscriber units comprising, integral to said communication control console, the steps of:
   A) converting at least some received voice signals into audible signals;
   A1) detecting the presence of incoming binary data signals initiated by a subscriber unit;
   A2) receiving the incoming binary data signals;
   B) decoding at least some received binary data signals;

C) converting at least some audible signals into source voice signals for transmission; and D) forming at least some source binary data signals for transmission; wherein:

said decoding step includes the step of converting said received binary data signals into a predetermined internal data format for use by the console; and said forming step includes the step of converting some source data into said predetermined internal data format for use by the console prior to forming said source binary data signals.

* * * * *